US010455042B2

(12) United States Patent
Dowdell

(10) Patent No.: US 10,455,042 B2
(45) Date of Patent: Oct. 22, 2019

(54) TRANSMITTING INFORMATION ACROSS A COMMUNICATIONS NETWORK

(71) Applicant: Airbus Defence and Space Limited

(72) Inventor: John Paul Dowdell, Newport Gwent (GB)

(73) Assignee: AIRBUS DEFENCE AND SPACE LIMITED, Stevenage (GB)

( * ) Notice: Subject to any disclaimer, the term of this patent is extended or adjusted under 35 U.S.C. 154(b) by 256 days.

(21) Appl. No.: 14/786,968

(22) PCT Filed: Apr. 25, 2014

(86) PCT No.: PCT/EP2014/058466
§ 371 (c)(1),
(2) Date: Oct. 23, 2015

(87) PCT Pub. No.: WO2014/174081
PCT Pub. Date: Oct. 30, 2014

(65) Prior Publication Data
US 2016/0105523 A1 Apr. 14, 2016

(30) Foreign Application Priority Data
Apr. 26, 2013 (EP) .................................. 13275102

(51) Int. Cl.
G06F 15/16 (2006.01)
H04L 29/08 (2006.01)
H04W 84/22 (2009.01)

(52) U.S. Cl.
CPC ......... *H04L 67/2823* (2013.01); *H04W 84/22* (2013.01)

(58) Field of Classification Search
CPC .. H04L 67/2823; H04L 1/0006; H04L 1/0023
USPC .................................................. 709/230, 203
See application file for complete search history.

(56) References Cited

U.S. PATENT DOCUMENTS

| 7,522,551 | B2 | 4/2009 | Giaimo et al. |
| 7,911,962 | B2 | 3/2011 | Khuu et al. |
| 9,510,048 | B2 * | 11/2016 | Kamay ............. H04N 21/2343 |
| 2004/0090924 | A1 | 5/2004 | Giaimo et al. |

(Continued)

OTHER PUBLICATIONS

Extended European Search Report for European Patent Application No. 13275102.5 dated Jul. 17, 2013, 6 pages.

*Primary Examiner* — Duyen M Doan
(74) *Attorney, Agent, or Firm* — Greer, Burns & Crain, Ltd.

(57) ABSTRACT

Information is transmitted across a wireless data network, comprising a wireless link (100) from a software application module on a computer hardware device (112) to a computer hardware device (110) associated with a destination node in the network. The application requests (114) the status of the route across the network, such information being optionally provided by a decision engine (104) which has access to network status parameters, such as bandwidth, latency and link quality. The application receives (118) the status information and then, and preferably only then, transmits (120) the data in a format chosen from a plurality of different formats (of differing richness of information represented by the date in each such format) in dependence on the indication of the status so received.

18 Claims, 2 Drawing Sheets

(56) References Cited

U.S. PATENT DOCUMENTS

| | | | |
|---|---|---|---|
| 2006/0067247 A1* | 3/2006 | Rajan | H04L 41/12 370/254 |
| 2006/0268707 A1* | 11/2006 | Lee | H04L 47/10 370/232 |
| 2007/0133405 A1* | 6/2007 | Bowra | H04L 43/00 370/230 |
| 2007/0263628 A1* | 11/2007 | Axelsson | H04L 45/00 370/392 |
| 2007/0274268 A1* | 11/2007 | Axelsson | H04L 45/00 370/338 |
| 2008/0107031 A1* | 5/2008 | Cnudde | H04L 43/0894 370/236 |
| 2011/0093605 A1* | 4/2011 | Choudhury | H04L 65/4084 709/231 |
| 2011/0116610 A1* | 5/2011 | Shaw | H04W 4/18 379/88.04 |
| 2012/0084463 A1* | 4/2012 | Holden | H04N 21/23439 709/246 |
| 2014/0187239 A1* | 7/2014 | Friend | H04L 29/08 455/426.1 |
| 2014/0258552 A1* | 9/2014 | Oyman | H04N 19/146 709/231 |

\* cited by examiner

TRANSMITTING INFORMATION ACROSS A COMMUNICATIONS NETWORK

FIELD OF THE INVENTION

The present invention concerns transmitting information across a communications network. More particularly, but not exclusively, this invention concerns a method of transmitting information across a data network comprising at least one wireless network node. The invention also concerns a mobile ad hoc network, a network node for use in such a network, and a computer software product for use within such a network.

BACKGROUND OF THE INVENTION

The present invention seeks to improve communication across a network which includes mobile wireless network nodes, for example a mesh network. Such mobile wireless network nodes may be deployed as part of an ad hoc network required at short notice, for example, when emergency services attend an incident at which telecommunication facilities are required to be provided quickly on-site. (Such a mobile ad hoc network may sometimes be referred to as a MANET.) Hard-wired, mobile phone, 3G, 4G, and satellite communications systems are not always readily available or convenient to use and as such radio-based mobile wireless network access points may need to be rapidly deployed to provide an effective communications system on the ground. In certain circumstances, there may be movement of the network access points/nodes in the network. The ability to transmit data from one node to another may change rapidly according to local environmental conditions.

Communication networks of the prior art cater for giving priority to certain types of communication and routing protocols exist which give priority to certain traffic, typically based on quality of service ("QoS") requirement information within the data packet headers. Software applications can set minimum QoS parameters for the transmission of data, which may then be acted on by routers to prioritise traffic appropriately. The differentiated services (DiffServ) architecture provides a mechanism for applications to achieve certain levels of service, by means of routers differentiating between different types of data traffic. Details of the DiffServ architecture and protocols are set out in RFC 2474 ("Definition of the Differentiated Services Field (DS Field) in the IPv4 and IPv6 Headers") and RFC 2475 ("An Architecture for Differentiated Services")—available from the Internet Engineering Task Force's (IETF) Network Working Group's RFC ("Request for Comments") set of documentation. The integrated services architecture ("IntServ"—see IETF's RFC 1633) also provides a means of guaranteeing QoS, by requiring each router on the route between source and destination to reserve sufficient bandwidth to ensure the QoS requirements are met (i.e. operating in a virtual circuit-switching mode). Both DiffServ and IntServ architectures have short-comings when operating in a MANET, because congestion and/or rapid changes in bandwidth, link quality etc. can readily occur at short-notice. When an application on a source computer attempts to send data to a destination computer via a MANET, the application can set QoS criteria, but if the network is unable to meet the minimum criteria the data may never reach its destination or be received incompletely or in a corrupted state. The destination computer may when receiving incomplete or corrupted data be able to communicate such facts to the source computer, and the destination computer may, for example by means of manual intervention, request that the data be resent. In such a case, the network connection may have deteriorated yet further making retransmission of the data more problematic. Also, retransmitting data can in itself cause unnecessary congestion of the network, because data is transmitted more than once across at least part of the same network. If the receipt of the data is time-critical or time-sensitive, the failure to send the data from source to destination may be viewed as a failure that it is not subsequently possible to remedy. Such problems are particularly acute when seeking to transmit data across a rapidly changing MANET.

US 2012/0002615 describes a means of communication across a MANET in which types of service are differentiated and a decision engine permits or prevents communication of certain types across the network, according to how demanding/important (how critical) the communication types are. Such a regime provides a very coarse means of provisioning network resources to traffic, and could readily prevent traffic other than that of the utmost critical importance dominating the network.

US 2011/0110309 discloses network node devices which cooperatively route traffic flow amongst wired and wireless networks by employing multi-path management processes. The possibility of a network device, programmed with a multi-path management software product, determining a particular path partly in dependence on the type of data is disclosed.

WO 2010/028311, relating to "enhanced wireless ad hoc communication techniques", discloses the concept of generating a cost-based routing matrix for a network node which results in a routing table which takes account of traffic type, for example by means of weighting according to traffic type.

The patent publications mentioned above provide suggestions for sophisticated routing of traffic across networks including wireless nodes, including taking account of the type of data being transmitted, but would appear to represent overly complicated solutions that might be difficult to implement efficiently in practice, especially in the context of routing data efficiently in a fast changing wireless ad hoc network, where the conditions of the network may change so rapidly as to render such sophisticated systems of little practical use, particular if and when the network is congested and/or required to serve volumes of traffic far beyond its current capacity.

The present invention seeks to mitigate one or more of the above-mentioned problems. Alternatively or additionally, the present invention seeks to provide an improved method of routing traffic within a data network.

SUMMARY OF THE INVENTION

The present invention provides, according to a first aspect, a method of transmitting information across a data network. The invention is of particular application in relation to a network comprising at least one wireless network node. The method makes use of the realisation that certain types of information are capable of being transmitted across the network by means of data in any of a plurality of different formats. There may for example be a first data format and a second data format, the second format being less demanding of the network than the first format by means of compromising on the way in which the information is represented by the data. A software application may have a need to transmit such information across such a network. In embodiments of the invention, the method comprises a step of a software application module running on computer hardware requesting the status of at least part of a route from a source node in the network to a destination node in the network. The source node may be located locally relative to the computer hardware running the software application module. The method is of particular application in a case where the route comprising at least one wireless link between two nodes within the network. The method comprises a step in which the software application module receives an indication of the status of said at least part of the route. The method comprises a step in which the software application module transmits the data in a format chosen from the plurality of different formats in dependence on a received indication of the status of said at least part of the route. The step of the software application module requesting the status of the route is advantageously performed before any attempt is made by the software application module to send the data to the destination node, and preferably before any attempt is made by the software application module to initiate the sending of any of the next batch of data/information to be sent. Thus, the software may determine in advance the state of the network, and its capability of handling a certain data format, before such data is actually sent. As such, failed or aborted attempts to send data in a richer than appropriate format may be avoided leading to improved efficiency and usage of the network appropriate to the network resources available at any given time.

Before the step of the software application module transmitting the data across the network is performed, the information may be represented by data in the first (relatively high quality) format. In view of the indication of the route status so received the software application module may then choose to transmit the data in the second (relatively lower quality and/or lower in richness of information) format.

It will be appreciated that the parts of the software application module which govern requesting of route status information and the format in which the data is transmitted may be distinct from those parts of the software application module which provide the core functionality of the application performed by the software application module. For example, the core functionality of the application may be defined by a video capture storage and playback application with the capability of outputting the data in various formats and the software application module could then be formed by means of integrating with such an application the other software module requirements.

Embodiments of the present invention thus, advantageously, provide for an automated and dynamically adapting mechanism by which there is effectively an explicit proactive decision to transmit data in a given format without wasting time and bandwidth on attempting to send information across the network in a richer than appropriate data format.

The computer hardware on which the software application module is running may be in the form of, but not limited to, a computer, such as a laptop, PC or server. The computer hardware on which the software application module is running may form at least part of a device, such as a phone, camera or the like. Such computer hardware may be local to a router. In some cases the software application module may be running on such a router.

The method may include an analysis step in which a processor, for example a processor associated with or forming part of a router or other network device, analyses one or more characteristics of said at least part of the route. Such a processor may be arranged to respond to the status request sent by the software application module by sending said indication of the status received by software application module. The processor could be associated with or form part of a central server. Such a central server could for example monitor and assess the network characteristics of all active links in a subnet or in an entire mobile network. (The afore-mentioned processor may be arranged to communicate with, as opposed to forming a part of, the central server.) The central server may be arranged to receive data concerning both network link transmission characteristics and also data concerning the physical position (and perhaps optionally velocity data) of nodes in the network. The central server may be arranged to receive other data concerning the physical environment in which the network nodes are located. The central server may be arranged to receive other data concerning the disposition of the network nodes such as power left, and/or a measure of vulnerability (for example a measure of risk of being rendered inoperative or "risk of capture"). The server may then, for example after analysing any or all of such data, perform a central overseeing function, preferably coordinating and improving the function (as judged by the ability of the network to transmit rich data for example) of the network, for example by directing movement of one or more network nodes to move the node to a better location. It will be appreciated that typically, the processor mentioned above will typically (but not necessarily) form part of computer hardware different from the computer hardware running the software application module.

The processor may repeatedly perform the analysing step. The processor may analyse at least one wireless link between two nodes at least once every 10 minutes, and possibly as often as five or more (or even ten or more) times every 10 minutes.

The indication of the status received by software application module may include an indication of whether or not one of the plurality of different formats of data is suitable for transmitting the information. The indication of the status received by software application module may include an indication of whether one or more of the plurality of different formats of data is/are unsuitable for transmitting the information. The indication of the status received by software application module may include an indication of which of the plurality of different formats of data is suitable for transmitting the information and preferably which of the plurality of different formats of data is suitable for transmitting the information. Preferably the indication of the status received by software application module includes an indication for each of the plurality of different formats of data as to whether or not that format of data is suitable for transmitting the information. The indication of the status received by software application module may include values of two or more parameters concerning characteristics of the network link. One of the parameters concerning characteristics of the network link may be the bandwidth of the link. One of the parameters concerning characteristics of the network link may be the latency in the link. One of the parameters concerning characteristics of the network link may be the link quality, for example the relative noise in the signal (by a signal to noise ratio measurement for example) and/or a measure of error rates. One of the parameters concerning characteristics of the network link may be the level of jitter. One of the parameters concerning characteristics of the network link may be the average packet loss rate across the link. It will of course be appreciated that a variety of these, and possibly other, parameters of the wireless link, network route, or part thereof, can be considered. The software application module may relate the values of one or more such parameters to which of the plurality of different formats of data is suitable for transmitting the information.

The indication of the status received by software application module may relate to that status at a particular instant in time, and the decision as to which data format to use may be chosen solely on the instantaneous measurements, without regard to historical measurements. More preferred however is for the analysis to take into account the way in which the one or more characteristics (for example as defined by one or more of the above-mentioned parameters) change over time. For example, trends may be taken into account. Thus, when choosing which data format to use, one or more characteristics of the link(s) between two nodes within the network both at a first time and at a second time, different from (for example later than) the first time, may be taken into account. Historical characteristics may thus be taken into account as well as the present characteristics. Predicted future characteristics may be taken into account as well as the present characteristics. The indication of the status received by the software application module may thus include an indication of not only the current status but also information from which a prediction of the future status can be made. The rate of change of a particular characteristic may be taken into account. Higher order changes in particular characteristics may be taken into account.

The software application module (and/or the aforementioned processor for responding to the status request sent by the software application module) may take into account an indication of the urgency of the information reaching the destination node. The software application module (and/or the aforementioned processor) may take into account an indication of the importance of the information reaching the destination node. Said indication of the urgency and/or the importance may be taken into account when the software application module chooses the format of the plurality of different formats in which to transmit the information. For example, a more reliable format (less demanding of the network) may be chosen so as to guarantee full delivery of the information, as opposed to sending data in the richest format required.

There may be three or more different formats of data in which to transmit the information. The method of the present invention has particular application in highly mobile dynamic ad hoc networks, and in particular, has particular application in fast changing wireless ad hoc networks. In such networks, the conditions of the network may change so rapidly as to render sophisticated networking management processes of little practical use. It is therefore preferable for the method to be relatively simple and therefore quick and easy to implement and use in practice. It may therefore be preferred for there to be no more than twenty different formats of data from which to choose. There may be no more than ten different formats of data. One or more formats may for example be defined such that the data represents video information, for example real-time (or streamed) video. One or more formats may for example be defined such that the data represents audio information, for example real-time (or streamed) audio.

The method preferably includes a step in which at least one node in the network publishes to all of its neighbouring nodes values of parameters which represent one or more characteristics (for example, bandwidth, latency, etc) of a link established with that node. One of the parameters may be in the form of the types (or formats) of data that the link is able to support. The method preferably further includes a step such that at least one such neighbouring node then re-publishes such information to one or more other nodes in the network.

The data network will typically comprise a multiplicity of nodes and a multiplicity of active communication links between pairs of such nodes. At least some of those links may be wireless links. Some links may be wired links. The network may be a MANET. The network may be in the form of any variable network. The method is preferably so performed that said at least part of the route covers at least three different links in the network. The software application module may receive an indication of the status of the entire route, from end-to-end. The network, controlled by the method of the present invention, may be connected to other networks, not so controlled.

During performance of the method, at least one (for example wireless) network node may move from a first location to a second location, separated from the first location by a significant distance. The distance between the first location and the second location may be further than 10 m, and may be further than 50 m. The distance between the first location and the second location may be further than 100 m. In some networks, one or more of the mobile nodes may move by considerable distances during operation of the network, for example by further than 500 m and sometimes further than 1 km. In some networks, more than one node, particularly wireless nodes, may move from one location to another. The method may therefore include a step of physically moving at least two wireless network nodes.

It is preferable for the method to be relatively quick to operate in practice. The method is preferably such that the time between the software application module requesting and receiving the indication of the status of the route is less than 10 seconds, and more preferably less than 1 second. The time taken may be less than 250 milliseconds. The step of the software application module requesting the status of the route is preferably performed regularly. (This may require the software application module to be required to send data in batches—see below). The rate of successively requesting the status of the route by the software application module may depend on the rate at which the characteristics of the links in the network change. In a fast-changing dynamic network the steps may be performed at least once every 10 minutes, and possibly as often as five or more (or even ten or more) times every 10 minutes.

Above it is mentioned that the software application module may send data in batches. In the case were the information is initially represented and transmitted in one format, and the status of the route is checked again by the software application module before all the information is transmitted successively by the software application module, and the status of the route has changed sufficiently to justify changing the data format in which the information is being transmitted, then the software application module may switch to sending the information in a different format. The software application module may be configured to send the information in the richest format feasible over any given period of time. The method of the invention may include a step of the software application module receiving a further indication of the status of said at least part of the route whilst data in the initially chosen format is being transmitted. The method may then, in dependence on the further indication of the status so received, include a step of choosing from the plurality of different formats, a format different from the initially chosen format. The method may then include a step of transmitting the data in that different format. A single collection of information may thereby be transmitted across the network in a sequence of batches of data of different formats which are chosen in advance in dependence on the status of the network. The richness of the information represented by the different format may differ (for example may be richer, and therefore more demanding of the network) from the richness of the information of the initially chosen format. The (re-)checking of the route status and the changing of the format of data being transmitted, may be carried out a plurality of times (possibly more than five times) during a single transmission of a given collection of information. For example, if a transmission is expected to last at least ten minutes (for example, ten minutes of video footage and audio recording of a scene, with associated data) and the status of the network is changing quickly such that the status of the route is checked regularly every seconds, the choice of format of data in which to transmit may be updated every 30 seconds (and adjusted accordingly) to transmit in the richest format in which the transmission can reliably be made over the next 30 seconds according to the indication of status most recently received.

Before the step of the software application module transmitting the data across the network is performed, the information to be sent may be represented by data in the first format, that being for example in the form of video of a given quality (for example of a given resolution and/or a given frame rate). In view of the indication of the route status so received the software application module may then choose to transmit the data in the second format, that being in the form of information of a lower quality (for example of a lower given resolution and/or a lower given frame rate). The software application module may provide the data in the second format. The software application module may convert data, for example raw data, representing the information into the second format. The software application module may perform conversion of data from the first format to the second format before it is transmitted. The data in the second format may be in the form of video data but of a lower quality than the video data of the first format. The data in the second format may comprise audio data and not an accompanying video file. Such audio data could for example be in the form of the sound file of the video. Such audio data could for example be in the form of an audio description of the video, preferably separate from, and independent of, the standard sound file of the video. The data in the second format may comprise one or more still images, for example standalone images (i.e. images preferably not forming part of a streamed video file, although still images could be extracted from one or more frames of a video file), such as GIF, JPEG, bitmap files or the like.

Before the step of the software application module transmitting the data across the network is performed, the information may be represented by data in the first format comprising audio data, (whether or not part of a video file). In view of the indication of the route status so received the software application module may then choose to transmit the audio data in the second format, that being in the form of information of a lower quality (for example a lower sampling bit-rate). Alternatively, in view of the indication of the route status so received the software application module may choose to transmit the data in the second format, in which at least part of the information represented by the audio is instead represented by text. The software application module may perform a step of converting from audio to text, for example by means of speech recognition software.

The present invention also provides, according to a second aspect of the invention, a method of transmitting information across a data network comprising at least one wireless network node, in which a processor analyses one or more characteristics of the status of at least part of a route from one node in the network to another node in the network, and then, in dependence on said one or more characteristics analysed by the processor, indicates which format or formats, if any, of data that can be supported by said at least part of the route. The processor will for example typically be programmed with route status software which enables the processor to indicate such format(s). It is preferred that the indication of which format or formats, if any, of data that can be supported by said at least part of the route is provided by means of converting parameters providing a measure of the characteristics of the network, or of links in the network, into such an indication as opposed to communicating the raw values of such parameters. For example, such a method may comprise the steps of the processor analysing one or more characteristics of the status of at least part of a route from one node in the network to another node in the network (the route optionally comprising at least one wireless link between two nodes within the network), the processor receiving a request from a software application module for an indication of which of the plurality of different formats data can be sent over said at least part of the route, and in response, and in dependence on said one or more characteristics analysed by the processor, the processor indicates which format or formats, if any, of data that can be supported by said at least part of the route. The steps of the methods of the first and second aspects of the invention may be combined and performed together. For example the method of the second aspect may include a step in which the software application module generates said request for the route status indication.

It will be understood that embodiments for carrying out the method(s) according solely to the first aspect of the invention may be provided by means solely of a computer hardware apparatus, running a software application module, connected to a network (requesting the status of a route or link in the network), whereas embodiments for carrying out the method(s) according solely to the second aspect may be provided by means solely of a processor associated with a router of a node in the network (analysing and indicating the status of a route or link in the network), the processor for example being programmed with software (i.e. "route status" software separate from the software application module on the computer hardware with which the processor communicates).

The present invention also provides, according to a third aspect of the invention, a mobile ad hoc network, comprising at least one network node (for example a wireless node) associated with a processor programmed with route status software, and arranged so as to perform the method of the first aspect or the second aspect of the invention as described or claimed herein. For example, the mobile ad hoc network may comprise at least one computer hardware device (for example a smart phone) connected (for example, wirelessly) to the network on which there is installed a software application module being arranged to function in accordance with the method of the first aspect of the invention as described or claimed herein. In certain aspects, the software application module may comprise a module for converting information from one data format to another, less rich, format. In certain aspects, there may be a data delivery software product (for example installed for execution by the processor) comprising a module for analysing data delivery characteristics of a link between a pair of network nodes. The route status software may comprise a module for correlating characteristics of a link between a pair of network nodes to one or more particular type(s) of data format. There may be further software products/modules for performing other steps of the method of the first and/or second aspects of the present invention. There may be other data, either forming part of the route status software or accessible to a processor when programmed with route status software, to allow the method of the first and/or second aspect of the invention to be performed with the use of a processor programmed with the route status software.

The present invention also provides, according to a fourth aspect of the invention, a mobile network node including a router, a wireless networking communications apparatus for transmitting and receiving data wirelessly, and a processor programmed with route status software so as to perform the method of the second aspect of the invention as described or claimed herein.

The present invention also provides, according to a fifth aspect of the invention, a computer software product for use in relation to any aspect of the invention as described or claimed herein. For example, the aforementioned application software module and/or the route status software may be embodied by such a software product.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
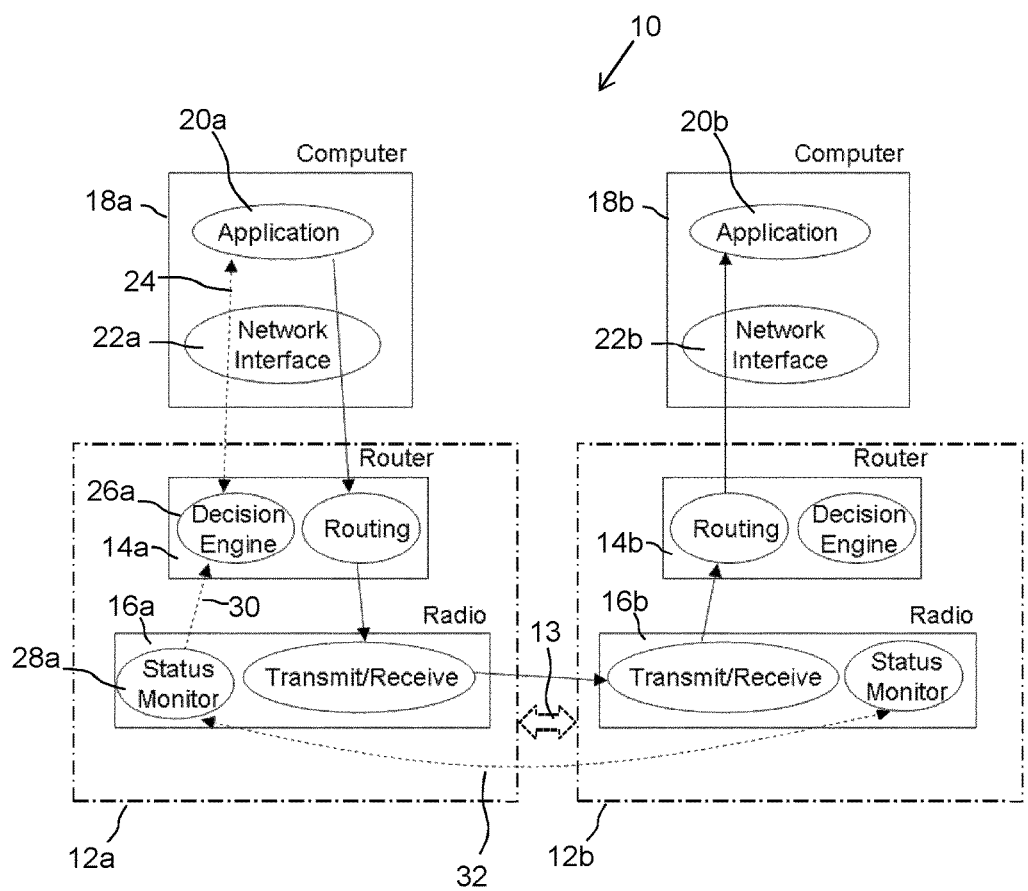
FIG. 1 is a schematic diagram showing transfer of information between computers via a wireless network link according to a first embodiment of the invention.

The first embodiment, as illustrated by FIG. 1, of the invention concerns managing the effective delivery of information from a source to a destination connected via a mobile ad hoc network by means of transmitting data across the network 10. In static networks, that is networks that contain routers that remain stationery and are connected by copper, optical fibre or wireless devices that are permanently or semi-permanently installed, the resources available to transmit data are generally seen as constant, and traffic management is based on providing percentage resources to traffic based on a view by the network administrator at a given point in time. Networks with fixed infrastructure supporting mobile devices also come into this category, such as commercial mobile phone networks.

In a mobile ad hoc network, of the type where there is no fixed infrastructure, and the network is constructed by two or more network nodes coming within transmission range of each other, the resources available to exchange data will vary considerably as the nodes move relative to each other. As the nodes move closer to each other, the received signal strength of wireless devices will increase, as will the link quality between them. The wireless devices may also be able to support progressively higher data rates if the wireless device supports a number of modulation schemes. Conversely, as the nodes move apart, the received signal strength and link quality will degrade. A significant problem with mobile data transmission is that wireless network conditions can vary considerably. Variations can arise as a result of changes in the distance between nodes, as a result of obstructions (for example, in the line of sight) causing attenuation or reflections, as a result of atmospheric conditions, as a result of other users of the data service, and so on. Such factors can result in the flow of data across a mobile wireless network being blocked or constrained for example because of insufficient bandwidth or poor link quality. Flow of data can also be adversely affected of course as a result of congestion with other contending flows of data from the same or other users and/or interference from other users of similar or unrelated wireless services. Conditions within a mobile ad hoc network can often deteriorate such that software applications written assuming transmission across wired networks fail to perform satisfactorily. Thus, it may not always be possible to deliver reliably all data from an application running on a computer to its intended destination fully and accurately in time.

In existing networks, there are mechanisms for reporting the status of the links in terms of latency, bandwidth, and error rate, but there is no mechanism that provides a correlation between the status of the link and its ability to transmit quantities of application data. A problem is that the time-varying attributes of a link may prevent a software application from sending the data, at least temporarily and possibly permanently.

In existing networks, data is often sent across the network to transfer information from one user to another. The data to be sent by an application will represent information in a particular form. Information can be depicted in many forms, depending on the quality or richness of the meaning that is to be conveyed. It is typically desirable for the quality or richness of the information, as represented by the data, to be as high as possible. It is often also desirable, and perhaps more important in certain contexts, that the information be relayed to its destination promptly and without significant degradation. It may sometimes be more important that essential elements of the information be conveyed quickly, reliably, and received in a manner from which those essential elements may be readily understood than for the information to be conveyed in a high-quality (or "rich") format which might risk the information being incompletely received and/or received late resulting in the essential elements of the information not being appreciated or understood soon enough at the destination. Applications written expressly for mobile networks are more likely to successfully deliver their information across mobile networks, but this is often achieved simply by means of creating a very simple system that requires a user to select a low richness format of data to send/receive, typically chosen from only two formats (for example, a first relatively high resolution format and a second relatively low resolution format).

By way of example and to illustrate the above analysis, if it were desired to convey information about a fire in a building, there may be a minor advantage in streaming a high quality video feed in real-time showing the extent of the fire, but it might be more desirable simply to convey such information by means of a series of low-resolution still JPEG images if there were a chance that the network route via which data is being sent would be unable to provide the bandwidth required to allow the video stream data reliably to reach its destination. Thus, in the present embodiment it is recognised that information can be represented in a less rich form using less data, if it is important that the information should arrive at the destination quickly. Moreover, in the present embodiment, the network is effectively arranged to provide the sending application with an indication (or with information from which such an indication may be derived) as to whether the information that is desired to be sent in a particular format can be delivered promptly, reliably and/or accurately, or not. If not, the application may then decide to send the information in a different format (for example, a less rich format), send the information at a later time, or send the information to a different or temporary destination. (It will of course be understood here, and elsewhere in the patent specification, that when it is stated that software, or a software module, performs a given action, that such a statement is short-hand for stating that the software, or software module, includes instructions that cause the computer processing unit programmed with such instructions to perform that given action or otherwise cause the action to be so performed.) The application can decide the format of data in which to send information before it starts to send such information. The sending application can also choose how much or little information to send based on the application's understanding of the importance of the information being delivered. The application may still choose to send very rich information on the understanding that there are likely to be delays before it is fully delivered, or it may choose to send less rich information if it understands that the information is time-sensitive. It may also seek to select a method of transmission which makes optimum use of the resources available.

FIG. 1 shows a part of a network in which the above principles are embodied. The network 10 includes first and second mobile wireless network nodes 12a, 12b connected by a wireless link 13. Each node comprises a router 14a, 14b and a radio receiver/transmitter 16a, 16b, each router 14a, 14b being connected through a wired connection to its corresponding radio transmitter/receiver 16a, 16b. A computer 18a programmed with an application 20a (a software application module) is arranged for communication with the first node 12a via a network interface 22a. The application 20a has information which is to be communicated to an application 20b running on a further, remotely located, computer 18b connected via a suitable network interface 22b for communication with the second node 12b. Using an agreed wireless transmission and reception protocol, the radio transmitter/receivers 16a, 16b are able to communicate directly with each other. In a general case, more than one computer may be connected to each router, and more than one radio may also be connected to the router. The task of the router is to determine the optimum path between a sending and receiving computer based on information gathered on the topology of the connections between them and any status information which the network designers have determined is of importance. (As mentioned below, the path data travels between source and destination node will typically be via multiple links—multiple hops—and there will be many nodes in the network). The channels of communication (link(s) between nodes) will typically be symmetrical such that each node will at any given time be able both to transmit and to receive data via an established communications link with another node. Each broadcasts signals for reception by any compatible node of the system within range and has an input for receipt of such signals. The computer processing function of the router associated with a node is provided with an associated memory (not represented on FIG. 1), for example, in which routing tables are stored and updated.

The information from the sending application is capable of being transmitted across the network 10 by means of data in one of several possible formats, of varying richness. In this case the information is in the form of video footage, with associated sound. "Information" can be described as data that has a meaning. In general, the information when presented in a richer format will take more data to describe and will therefore take longer to convey assuming a constant transmission bandwidth, than information that is less rich. If there is limited time in which to convey information, or limited bandwidth across which to convey time-varying information, the application 20a can decide to send the same information in a less rich form to ensure timely arrival.

Before the software application module starts the sending of the information, across the network 10, from the first computer 18a to the second computer 18b, the software application 20a requests (arrow 24) the status of the wireless link 13 by means of interrogating a decision engine module 26a of the router 14a. The decision engine module 26a periodically receives parameters, via a control data path (arrow 30) from a status monitor 28a that forms part of the radio system 16a of the node 12a. The parameters concerning the status of the link which are received by the decision engine module 26a include available bandwidth, latency and a measurement of link quality (in this case effected by means of a measure of signal-to-noise ratio). The decision engine module 26a also receives indications/measures, from various sensors data sources, of the position, velocity, and track of the mobile network node 12a, obstructions in the terrain, atmospheric conditions and the predicted radio performance in the near future. The status monitor of one node in the network shares (arrow 32) such information (including, for example, the parameters mentioned above) with other nodes in the network. The decision engine 26a maintains a repository (not represented on FIG. 1) of parameters received from the status monitors, which is then used to respond to the application's status request. The application 20a can subscribe to the decision engine 26a, such that the application 20a is advised by the decision engine 26a in a manner which is relevant to the application 20a. Link status updates can be provided on demand, at regular time intervals, or when one or more specified thresholds have been exceeded. Thus, the frequency at which the software application checks the link status, and therefore the frequency at which the decision engine needs to receive the network parameters from the status monitor can be set (and modified) on a case by case basis. In some scenarios where one or more nodes are expected to be moving rapidly from one location to another, or for there to be rapid changes in the local environment of a kind likely to affect communication between nodes, the frequency of network status checks may need to be carried out one or more times every minute. In other circumstances ten network status checks, or fewer, per hour may be sufficient. The frequency of such network status checks may be varied dynamically in view of a measure of the variation in successive network status checks, or in dependence on triggers caused by other measurable changes in the network (such as movement of nodes).

It is left to the application 20a to decide when and if so in what format to transmit the information to be sent to the second computer 18b. A video transmission application may decide to continuously stream high-resolution video when sufficient bandwidth exists, and to use a lower resolution at the same picture size when less bandwidth is available. However, the decision could have been made to maintain picture resolution and size, but to significantly decrease the frame rate; the decision can depend on the preferences of the consumer of the information (or on the preferences of the provider of the information).

Other than the handshake-style communication between the software application and the network after which the software application is then able to choose which data format to use for transmission of data, standard protocols may be used in the wireless network communication across the network. The route across the network may however be fixed in advance. Thus, some communication between nodes could be via a circuit-switched communication mode, possibly a virtual circuit-switched mode. The communication between nodes will typically be via a packet-switch communication mode.

The apparatus shown in FIG. 1 can be used in a scenario in which transmission, from the first computer 18a to the second computer 18b, of information concerning a scenic representation with movement is required. The selected format could be a streaming video at a data rate less than or equal to that available between the nodes, a sequence of still pictures, an audio description, or a textual description with a total data size equal to the bandwidth available for user traffic between the nodes multiplied by the total time available to transmit such data. The available time for transmission can be deduced from knowledge of the current geographic position of each node, plus current velocity and track, which can be derived from on-board sensors and prior programming.

Figure 2:
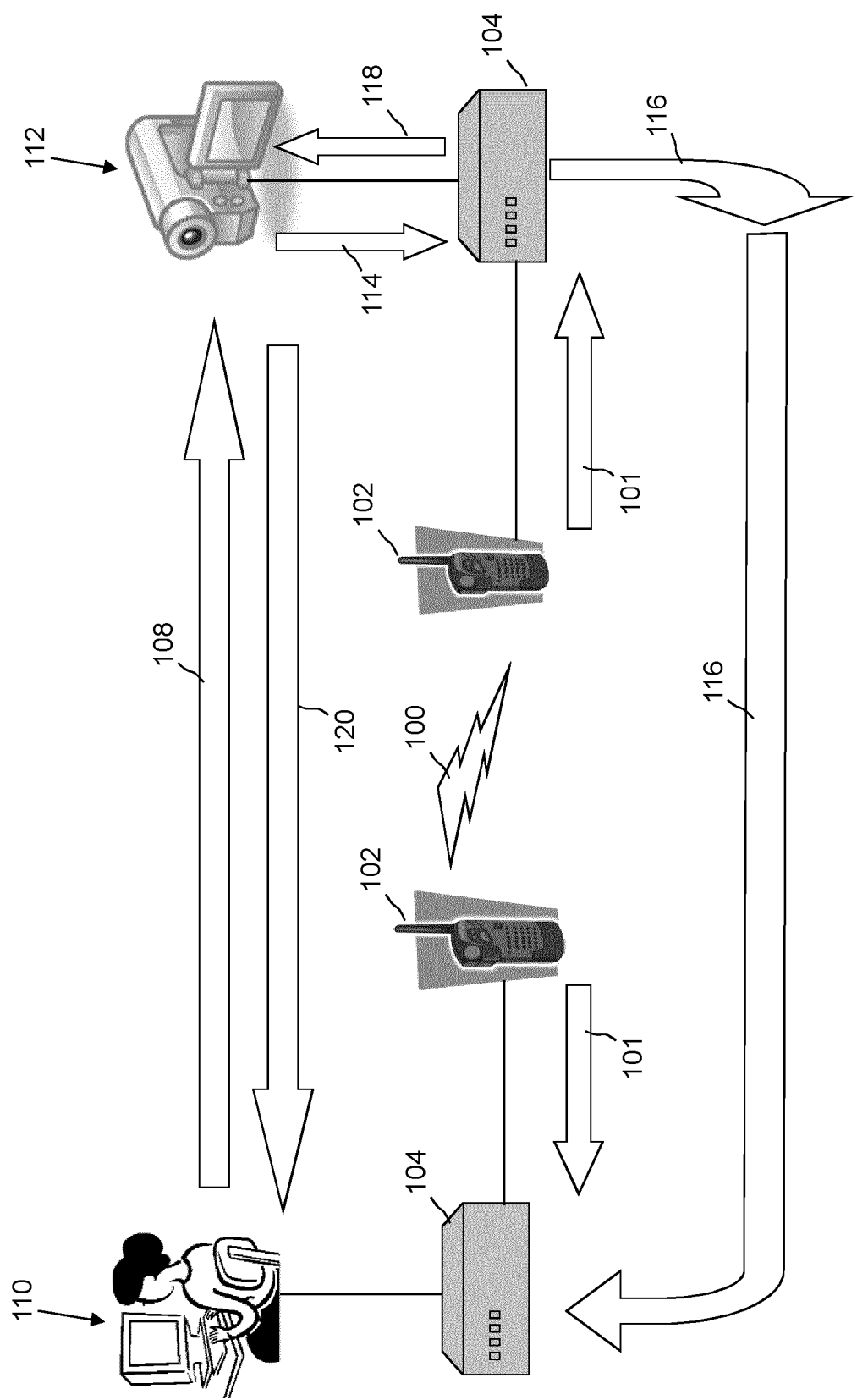
FIG. 2 is a schematic diagram showing transfer of information from a camera to a computer via a wireless network link according to a second embodiment of the invention.

FIG. 2 shows the operation of a second embodiment of the present invention, which concerns a method of transmitting information across a data network including a wireless link 100 between two radios 102 of two respective network nodes. As with the first embodiment, the information is capable of being represented by means of data in any of a number of different formats of differing richness. Periodically (as represented by arrows 101), each radio 102 provides metrics via a wired connection to a computer processor running a decision engine software module 104, the metrics concerning the status of the wireless link 100. As a first step (represented by arrow 108), a user 110 requests data from a camera 112 of a moving scene. As a second step (represented by arrow 114), a software application module running on the camera 112 sends to the local network node a request for an indication of the status of the network route (wireless link 100) from the camera 112 to the user 110. This second step is performed before any attempt is made by the camera 112 to send any video data to the user 110. The decision engine 104 of the local network node (the node which is hard-wired to the camera) receives the request from the camera's software application. As a third step (schematically represented by arrows 116), the decision engine 104 of the source node establishes the network route status (as defined by a number of different parameters—for example bandwidth, latency and link quality) of the route from the source node (connected to the camera) to the destination node (connected to the user). As a fourth step (represented by arrow 118), in response to, and in dependence on, the network route status ascertained by the decision engine 104 of the source node, the decision engine 104 provides feedback to the software application associated with the camera 112 in the form of an indication of the format or formats, if any, of data that can be supported by the route (or at least one or more metrics from which such an indication can be ascertained by the software application associated with the camera 112). Then, and only then, is a fifth step (schematically represented by arrow 120) performed, by which the software application module of the camera 112 starts transmitting the data (via the wireless link 100) in a format chosen in dependence on the indication so received in the fourth step.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Wired and/or wireless links may be analysed and categorised by the above-described method.

Although each of FIGS. 1 and 2 shows only two network nodes, the system is expandable to evaluate metrics of links two or more hops distant from the originator of the information. Thus an entire path to a particular destination can be queried, since each link in the path could have different characteristics, each of which will change with time. The evaluation of the whole path is important, since the information being sent is intended for the destination. If no path is available, but part of a path is, then a decision may be taken to send the information as far as is possible with the connectivity available, then to store the information temporarily pending an improvement in connectivity.

As mentioned above, if an application can be advised that the network is unable to support transmission of information in a particular form, then the application can choose to send the same information in a less rich form to expedite arrival at the intended destination. If however the application still desires to send the information in the rich form, then it may decide to cease transmission until such time as the network can advise that transmission conditions have improved.

In a development of the described embodiments, if each network node shares its status with other nodes, and also with a central server arranged to perform a central overseeing function, then it is possible to coordinate and optimise the movements of the network nodes to achieve an effect greater than that which may be currently available.

There may be many network nodes. Each network node may be provided by different type of equipment. Some network nodes will be mobile and there will be an expectation that the physical position of the node will change rapidly with time, thus requiring a dynamically adapting network. Other network nodes may be primarily static, but provided on an ad hoc basis. Weather conditions or other environmental conditions may change quickly, affecting the quality of wireless communication between nodes in the network. All nodes in the embodiments illustrated by FIGS. 1 and 2 are in the form of radio-based ("wireless") routers. It will be appreciated that one of the routers may be connected to a base unit that serves as a central communications hub. Such a hub may be independent of the central server mentioned above, if provided. Such a central communications hub may be connected to one or more further networks, including for example an IP-based network such as the Internet. Such a connection may be provided by a satellite-based communications link. The hub node may act as a base station node.

It will of course be appreciated that the links shown in the Figures as existing between a pair of nodes are schematic representations of the lines of communications between nodes and that each node receives and transmits signals wirelessly via one or more conventional antenna. Wireless signals may be subject to time/frequency division/multiplexing to form separate channels for communication. Alternatively, or additionally, standard wireless communication protocols are employed as appropriate for allowing many nodes to share one communication channel when transmitting/receiving data. Data sent across the wireless network may be encrypted using standard protocols.

The network status information provided by the decision engine to the software application may include an indication of how fast changing the network status is. It may include a prediction of for how long the present indication of network status may be deemed as valid/reliable. As such the decision engine may monitor the history and/or trends in the network status. Previous measures (of the bandwidth available, the average latency in the link, and the link quality measure) are stored in memory enabling the decision engine to generate a prediction of the capability of the link/route in question to carry reliably data of a certain format for a given period of time. This is achieved by using the historic measurements (giving an indication of the trends/rates of change in the system) and the present measurements to generate an indication of the ability of the link to sustain certain data formats (by means of comparison against pre-set thresholds). For example, a real time video of a particular resolution, frame rate, when streamed in accordance with a particular protocol, may have minimum (pre-set) requirements (limits) for the bandwidth available, the average latency in the link and the error rate (link quality) over a given period of time (say of the order of five minutes). With knowledge of the available bandwidth, the average latency and link quality at a given instant and with the knowledge of the trend, over time, in view of historical data, in the changes in such parameters, it is possible to predict a likelihood that the available bandwidth, the average latency and link quality will be maintained within the acceptable limits for the given period of time. If the confidence (the calculated likelihood) is sufficiently high (above a threshold value) then the link may be declared suitable for real-time video streaming at a particular frame rate and resolution. If not, the instantaneous available bandwidth, the average latency and link quality of the link, and future predicted trends may still indicate that the wireless link is suitable for video streaming at a lower frame rate and/or lower image resolution, is suitable for streaming real-time audio for a (possibly different) given period of time, or is suitable for a format of data having yet lower demands.

The parameters concerning the status of the link which are received by the decision engine module could include different or further parameters. For example, other parameters such as jitter, packet loss rate, and error rate could be provided.

The manner and method of the querying of the status of a link may be performed in accordance with any suitable protocol. It is envisaged that the Dynamic Link Exchange Protocol (DLEP) currently under development in the Internet Engineering Task Force will be suitable for example. An important factor is the ability to extract the instantaneous readings from a network device. The exact readings will vary according to the type of network device; some readings may be directly from equipment located in the network device, and some readings may be derived from several direct readings and processed to a form that the decision engine is able to understand. Examples of the former may be signal-to-noise (SNR) ratio, or energy per bit to noise power spectral density ratio ($E_b/N_o$). For the latter, according to the type of network device, and knowing the modulation and error correction schemes, it is possible to calculate or empirically measure the raw data rate (in bit/s) that the link can sustain. When a network device, such as a wireless device, is able to automatically compensate for degraded transmission conditions, such as engaging a less complex modulation scheme or by increasing the amount of Forward Error Correction being used, the status reports on changing modulation scheme or Forward Error Correction could indicate link instability. In addition, where a wireless device is part of a cellular or trunked radio system, information such as cell identity may be relayed according to the location of the device in the network, and, when taken together with positional status reports, it is possible to ascertain when cell handovers are likely to occur or when coverage is likely to be lost altogether.

The data formats may be categorised according to a standard, known to all nodes in the network. A standard that could be used/adapted for us is the Multipurpose Internet Mail Extensions (MIME) standard as set out in the Internet Engineering Task Force's (IETF) Network Working Group's RFC ("Request for Comments") Document No. 2046. The types of data are classified into a small number of main types which may each have further sub-classification. The five discrete top-level media types are defined as text, real-time audio, image (e.g. JPEG), real-time video (e.g. MPEG), and application (e.g. other data files such as spreadsheets, word processing data files, certain executable files, and the like). The MIME standard also includes two composite top-level media types, namely "multipart" (data consisting of multiple entities of independent data types) and "message" (an encapsulated message), which can be treated separately and/or discounted altogether in certain embodiments of the present invention.

There may be a finite number of different data formats from a comprehensive set of data formats that may be used for information transfer. The set of suitable data formats may be defined on a case-by-case basis. For example, below is a set of ten different data formats that may be used.

Data format 1—plain text/simple data transmission (at low data transfer rate)—low importance/criticality, Data format 2—plain text/simple data transmission (at low data transfer rate)—high importance/criticality, Data format 3—non-streaming data transmission (at medium data transfer rate)—low importance/criticality, Data format 4—non-streaming data transmission (at medium data transfer rate)—high importance/criticality, Data format 5—non-streaming data transmission (at high data transfer rate), Data format 6—streaming audio transmission (low quality—low bit-rate), Data format 7—streaming audio transmission (high quality—high bit-rate)

Data format 8—streaming video transmission (low quality—i.e. low resolution image and/or low frame rate), Data format 9—streaming video transmission (medium quality), and Data format 10—streaming video transmission (high quality—i.e. high resolution image and/or high frame rate).

Having just ten types of data format between which to convert information provides a relatively simple to implement and fast to operate solution.

The network may be wholly decentralised, without any management by a central server and/or centrally managed hub.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of transmitting a given collection of information across a data network comprising at least one wireless network node,
the given collection of information being capable of being transmitted across the network by means of data in a plurality of different formats including a first format and a second format, the second format being less demanding of the network than the first format by means of compromising on the way in which the information is represented by the data, wherein the method comprises the steps of:
a software application module running on computer hardware having the collection of information for transmission across a data network requesting a status of at least part of a route from a local node in the network to a destination node in the network, the route comprising at least one wireless link between the local node and the destination node within the network;
the software application module receiving an indication of the status of said at least part of the route, wherein the indication of the status of the route received by the software application module includes an indication of a current status as well as a rate of change of a particular characteristic from which a prediction of a future status can be made;
the software application module transmitting the data in an initial format chosen from among at least the first format and the second format in dependence on at least the received indication of the current status as well as the received rate of change of the particular characteristic;
wherein the step of the software application module requesting the status of the route is performed before any attempt is made by the software application module to initiate the sending of the data to the destination node; and then
while the data representing the given collection of information is being transmitted in the initially chosen format;
the software application module receiving a further indication of the status of said at least part of the route wherein said further indication of the status of the route received by the software application module includes a further indication of the current status as well as a further rate of change of the particular characteristic from which the prediction of the future status can be made; and
in dependence on at least the received further indication of current status as well as the received further rate of change of the particular characteristic, choosing a format different from the initially chosen format from among the at least the first format and the second format, and
subsequently transmitting data in that different format.

2. A method according to claim 1, wherein the method includes an analysis step in which a processor analyses one or more characteristics of said at least part of the route, and responds to the status request sent by the software application module by sending said indication of the status received by software application module.

3. A method according to claim 1, wherein the indication of the status received by the software application module includes an indication of which of the plurality of different formats of data is suitable for transmitting the information.

4. A method according to claim 1, wherein the method includes a step in which at least one node in the network publishes to all of its neighboring nodes values of parameters which represent one or more characteristics of a link established with that node, and at least one such neighboring node re-publishes such information to one or more other nodes in the network.

5. A method according to claim 1, wherein before the step of the software application module transmitting the data across the network is performed, the information is represented by data in the first format, that being in the form of video of a given quality, and
wherein in view of the indication of the route status so received the software application module chooses to transmit the data in the second format, that being in the form of information of a lower quality, and, as a result, the software application module provides the data in the second format before it is transmitted.

6. A method according to claim 1, wherein before the step of the software application module transmitting the data across the network is performed, the information is represented by data in the first format and comprises audio data, and
wherein in view of the indication of the route status so received the software application module chooses to transmit the data in the second format, in which at least part of the audio is converted to text by means of the software application module before it is transmitted.

7. A method of transmitting information across a data network comprising at least one wireless network node,
the information being capable of being transmitted across the network by means of data in a plurality of different formats including a first format and a second format, the second format being less demanding of the network than the first format by means of compromising on the way in which the information is represented by the data,
wherein the method comprises the steps of:
a processor analyzing one or more characteristics of a status and a rate of change of a particular characteristic from which a prediction of a future status can be made, of at least part of a route from one node in the network to another node in the network, the route comprising at least one wireless link between two nodes within the network;
the processor receiving a request from a software application module for an indication of which of the plurality of different formats data can be sent over said at least part of the route,
in response, and in dependence on said one or more characteristics and said rate of change analyzed by the processor, the processor indicates which format or formats, if any, of the data among the plurality of different formats including at least the first format and the second format that can be supported by said at least part of the route,
the processor periodically reanalyzing said one or more characteristics of a status and a rate of change of a particular characteristic from which a prediction of the future status can be made, of said at least part of a route, during transmission of a given collection of information, and in dependence on said one or more characteristics and said rate of change reanalyzed by the processor, indicating which format or formats, if any, of the data that can be supported by said at least part of the route, at least one of said formats being a format different from a previously indicated format or formats among the plurality of different formats including at least the first format and the second format.

8. A method according to claim 7, wherein the method includes performance of a step which generates said request from the software application module.

9. A mobile ad hoc network comprising at least one computer hardware device connected to the network on which there is installed a software application module being arranged to function in accordance with the method of claim 1.

10. A mobile ad hoc network comprising at least one wireless network node associated with a processor programmed with route status software so as to perform the method of claim 7.

11. A computer software product including executable instructions stored on a non-transitory computer readable medium for loading onto a computer hardware device, wherein the software product is configured to perform the steps instructed by the software application module in accordance with the method of claim 1.

12. A computer software product including executable instructions stored on a non-transitory computer-readable medium for loading onto a computer processor, wherein the software product is configured to cause the processor to perform the steps performed by the processor in accordance with the method of claim 7.

13. A computer software product including executable instructions stored on a non-transitory computer-readable medium for loading onto a computer processor, wherein the software product is configured to cause the processor to perform the steps performed by the processor in accordance with the method of claim 8.

14. A method according to claim 1, wherein the method further includes the steps of:
  the software application module making a further request for the status of said at least part of the route while data in the initially chosen format is being transmitted, said further indication of the status being received in response to said further request.

15. A method according to claim 14, wherein the steps of:
  the software application module making a further request for the status of said at least part of the route while data in a currently chosen format is being transmitted;
  the software application module receiving a further indication of the status of said at least part of the route; and
  in dependence on the further indication of the status so received, choosing from the plurality of different formats, a format different from the currently chosen format, and
  subsequently transmitting data in that different format;
  are carried out a plurality of times during a single transmission of a given collection of information.

16. A method according to claim 15, wherein the rate of successively requesting the status of said at least part of the route by the software application depends on the rate at which the characteristics of said at least one wireless links changes.

17. A method according to claim 1, wherein the software application module, in choosing the initial format, further takes into account an indication of an urgency of the collection of information reaching the destination node.

18. A method according to claim 7, wherein the processor indicating which format or formats, if any, of the data among the plurality of different formats that can be supported by said at least part of the route is in further dependence on an indication of an urgency of the information reaching said another node in the network.

* * * * *